United States Patent [19]
Vaders et al.

[11] Patent Number: 5,397,406
[45] Date of Patent: Mar. 14, 1995

[54] METHODS OF DESIGNING EMBOSSING DIES AND MAKING WOOD COMPOSITE PRODUCTS

[75] Inventors: Dennis H. Vaders, Elkin, N.C.; Nian-hua Ou, St. Charles, Ill.

[73] Assignee: Masonite Corporation, Chicago, Ill.

[21] Appl. No.: 901,388

[22] Filed: Jun. 19, 1992

[51] Int. Cl.⁶ .............................................. B32B 31/00
[52] U.S. Cl. ........................ 156/64; 156/219; 156/563; 156/581; 264/293; 264/522; 264/547
[58] Field of Search .............. 156/196, 219, 559, 563, 156/581, 64; 264/293, 522, 547

[56] References Cited
U.S. PATENT DOCUMENTS 3,892,473  7/1975  Ando et al. .................. 350/162 R
4,544,440 10/1985  Wheeler .................... 156/219 X Primary Examiner—David A. Simmons
Assistant Examiner—Paul M. Rivard
Attorney, Agent, or Firm—Marshall, O'Toole, Gerstein, Murray & Borun

[57] ABSTRACT

Methods are provided for the design of backing dies utilized with front, decorative embossing dies for the simultaneous production and embossing of wood composite panels. The methods apply where more than one decorative pattern is embossed onto the wood composite panels during a single press cycle. The cross-sectional area or volume of the panels impressed with each different decorative pattern forms the basis for the methods of the design. Included are methods of forming wood composite panels using dies made according to the disclosed die design methods.

50 Claims, 6 Drawing Sheets

METHODS OF DESIGNING EMBOSSING DIES AND MAKING WOOD COMPOSITE PRODUCTS

BACKGROUND OF THE INVENTION

1. Field of the Invention

The invention relates generally to methods of forming wood composite panels having an embossed front face and, more particularly, the invention relates to methods of die design for the embossing of the back faces of such panels to effect substantially uniform, acceptable product performance when more than one front face pattern is being embossed onto a panel or panels by a single press during a press cycle. The invention also includes methods of forming wood composite panels using dies made according to the inventive die design methods.

2. Description of Related Technology

It is often desirable to produce wood composite panels having an embossed or molded front face in applications where the appearance of the wood is important, such as for simulated wood siding. The presses used for compressing raw material wood composite mats into consolidated, integral panels may be large and adapted to hold multiple sets of embossing dies. Thus, it may be desirable to produce numerous wood composite panels during a press cycle of a single press with each panel having a different pattern embossed thereon. Furthermore, it may be desirable to impress more than one pattern onto a single panel.

However, problems arise when an attempt is made to simultaneously consolidate and emboss a panel or panels with more than one embossing pattern. As discussed more fully below, because the press is not equipped to provide individual caliper control at various locations along a raw material mat where an increase or decrease in pressure may be needed to adequately compress the mat, die set designs including embossed upper dies and flat lower dies often do not produce panels with acceptable characteristics such as sufficient physical strength. In order to further explain this problem, the formation of a conventional flat panel shall first be discussed.

A flat panel is produced by compressing a mat of raw composite material between an upper die and a lower die attached to respective upper and lower heated platens of the press. A mat of raw material may be prepared by a variety of processes and comprise a variety of shapes or types of raw wood fragments such as wood flakes, strands, particles, chips and fibers. In what is generally referred to as a dry process, the raw wood fragments are pre-coated with a thermosetting resin binder and remain generally disassociated until pressed with heat which cures the resin binder. The mat may also be produced by a wet process wherein (1) cellulosic fibers are blended with water to form a slurry and (2) most of the water is removed to form a wet mat of cellulosic material.

The press and attached die set provide a substantially uniform pressing force across the surface of the mat being pressed. In other words, the sum of the contact forces over the entire face of a mat, which is equal to the total force exerted by the mat on a die, is equal at each location or point on the mat. As a result, each mat placed within a press during a single press cycle ideally compresses to the same nominal thickness.

A panel with an "ideal" nominal thickness is made from a pressing process utilizing reasonable temperature, pressure and time values and the least amount of raw material possible to produce a panel exhibiting adequate strength and other desired characteristics. If a panel is pressed beyond its "ideal" nominal thickness, overdensification occurs resulting in undesirable characteristics such as brittleness and blistering.

The design criterion of an "ideal" nominal thickness for a flat panel has also been used for producing panels having an embossed surface. It has been found however that when a mat is pressed between a first die having an embossing surface and a second die having a generally flat surface, an increased surface pressure is required to compress the mat where the resulting product is thinner than the "ideal" nominal thickness. Thus, the remainder of the mat does not compress to the "ideal" nominal thickness. Stated in another way, the most compressed portion of a mat may act as a stop, barring the adequate compression of the remainder of the mat or mats being compressed at the same time. Likewise where an embossing die includes cavities resulting in mat portions not being pressed to the "ideal" nominal thickness, the remainder of the mat (or other mats being simultaneously pressed) may compress to a thickness which is less (thinner) than the "ideal" nominal thickness.

Where a single decorative pattern is embossed onto a panel or panels, the above-described thickness variations are not problematic because the generally flat, non-embossing lower die may be replaced with an embossing die specifically designed to cooperate with the upper die to form a panel having acceptable thickness and density ranges. For example, the contour of the lower die may be designed to roughly complement the contour of the decorative pattern on the upper die. In this manner, the upper and lower embossing dies become a generally "mating" die set similar to what is used in the molding art. Examples of methods of preparing wood composite panels using cooperating upper and lower dies are described in Wheeler, U.S. Pat. No. 3,868,300 (Feb. 25, 1975) and Schultz, U.S. Pat. No. 4,726,881 (Feb. 23, 1988).

However, when more than one embossing pattern is pressed onto a mat or when multiple mats are pressed with different patterns during a single press cycle, merely providing "mating" first and second dies does not produce panels with acceptable thickness and density ranges. Because of the pattern variations, overdensification or underdensification of certain portions of the panels typically results. Laboratory-scale tests used to simulate conditions found in large multi-opening presses have shown as much as a seventeen percent difference between desired and obtained thicknesses for embossed products formed during the tests. Therefore, such panels have not performed adequately when tested for properties such as adequate physical strength and uniform, minimal moisture absorption.

One solution to this problem is to use more raw material in the press (ie. raw material mats of greater density). This would increase the overall nominal pressing thickness of the final product. Therefore, the thickness differences in an embossed panel would be a smaller percentage of the overall thickness and the range of densities occurring within a panel would be reduced. However, this solution is unacceptable because of the increased cost associated with the use of additional raw material.

Another solution would be to utilize press/die set combinations adapted to provide individual caliper control at each die set. In large presses which, for example, may include as many as fourteen openings for the insertion of raw material mats (i.e. fifteen horizontal, parallel platens, thirteen of which have both an upper and a lower die mounted thereon), the addition of a means for precise individual caliper control would be complex and therefore expensive.

SUMMARY OF THE INVENTION

It is an object of the invention to overcome one or more of the problems described above.

According to the invention, a method of die set design is provided for use in the simultaneous embossing of two or more embossing patterns on composite material during one press cycle of a single press to produce an embossed composite product, typically in the form of a panel or panels. Where the embossing patterns vary with respect to product width, but not with respect to product length, the method comprises the steps of:

(a) designing at least two decorative embossing patterns on at least one first embossing die, (b) designing a second die corresponding to each said first die, each corresponding first and second die forming a die set, each second die being designed to cooperate with each first die to form at least one finished composite product having a substantially uniform desired nominal thickness and wherein said composite product may include product sections, each section embossed with a different embossing pattern, (c) calculating the cross-sectional area of each section of each finished composite product of (b) impressed with a different decorative embossing pattern, (d) designating a preferred die set or die set portion defining a preferred cross-sectional area from the cross-sectional areas determined in (c), all other die sets or die set portions being considered non-preferred and (e) adjusting the second die of each non-preferred die set or die set portion to produce a product section having the preferred cross-sectional area.

Where the embossing patterns vary with respect to product width and length, the calculations of cross-sectional area in steps (d) and (e) are replaced by calculations of product volume.

The invention also includes methods of simultaneously forming wood composite panels having different patterns embossed thereon using dies made according to the inventive die design methods.

Other objects and advantages of the invention will be apparent to those skilled in the art and from the following detailed description, taken in conjunction with the drawings and the appended claims.

BRIEF DESCRIPTION OF THE DRAWINGS

FIG. 1b is a cross-sectional view of the OSB-fiberboard composite structure of FIG. 1a.

FIG. 7a is a cross-sectional view of two panels according to FIG. 4a.

DETAILED DESCRIPTION OF THE INVENTION

Figure 1A:
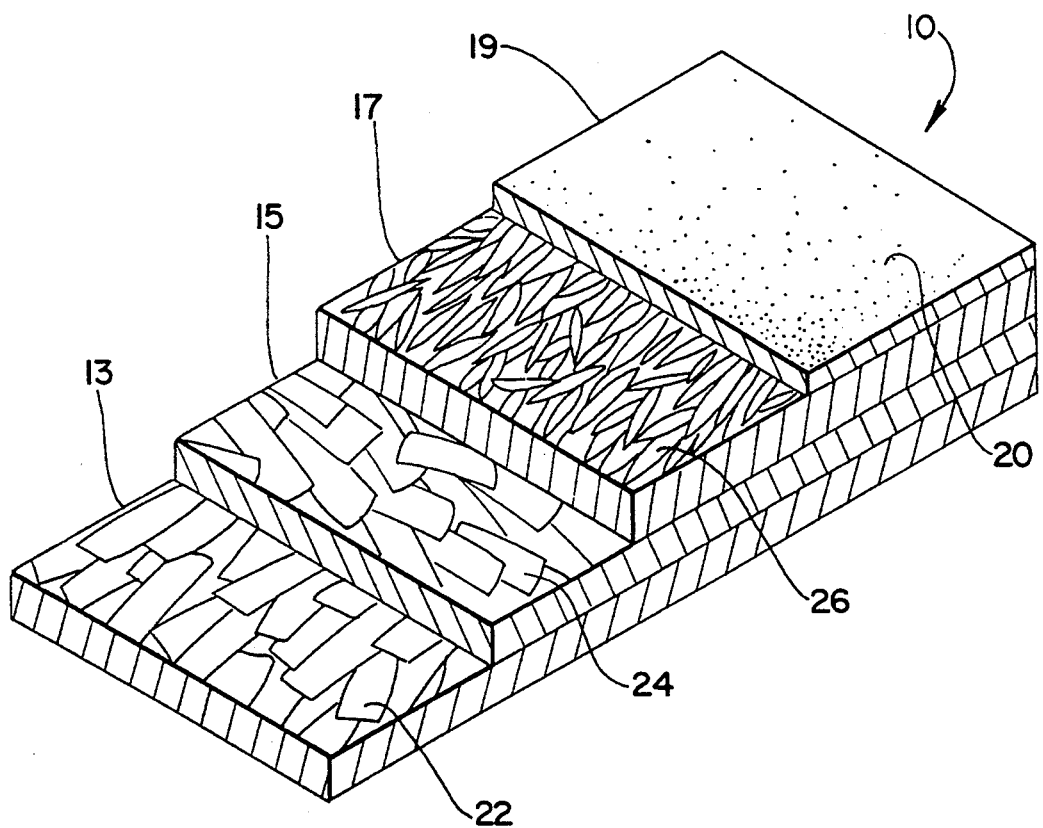
FIG. 1a is a cut-away perspective view of an oriented strand board ("OSB")-fiberboard composite structure utilized in the methods of the invention.

The methods of the invention concern the design of die sets used for the production of wood composite panels wherein cellulosic raw material is pressed between first and second dies to concurrently (1) form a consolidated integral product and (2) emboss a front face thereof. The methods of the invention apply in at least the following situations: (a) where more than one embossing pattern is impressed onto a raw material mat by a first embossing die of a die set, forming a single panel and/or (b) where multiple panels are formed by multiple die sets which are mounted on a single press, the die sets including first embossing dies having various patterns.

For each panel or panel section being simultaneously consolidated in a die set and embossed with a different pattern, the different decorative patterns typically vary with respect to panel width and may (but typically do not) vary with respect to panel length. Thus, a method of the invention provides for the adjustment of the contour of the backing die (the second die which does not include a decorative pattern) so that the die sets or die set portions being impressed by different decorative patterns produce finished panels or panel sections of substantially equal cross-sectional area.

If the decorative embossing patterns vary with respect to the length and width of the panels or panel sections being embossed with different patterns, the resulting volume of the finished panels or panel sections would be used as a design criterion. Therefore, the backing die or dies would be designed to produce panels or panel sections of substantially equal volume.

An important aspect of the methods of die design described herein is the use of caliper control pushes in the form of bars or strips, which may be integral with the backing die or dies or subsequently fixed thereto to reduce the cross-sectional area or volume of a panel or panel section. The caliper control pushes are preferably in spaced parallel relation. If the decorative embossing patterns vary with respect to panel (and die) width but not with respect to panel length, the pushes are preferably oriented in a direction parallel to the length of the die. Such pushes are advantageous because they may be easily reduced in size or removed to increase the cross-sectional area or volume of a panel or panel section. This may be accomplished in the field for fine tuning of the product thickness.

The following model relating product thickness to pressing pressure is of assistance in explaining the methods of the invention. An assumption is made that the relationship between pressing pressure and density is linear. Product testing has generally confirmed this assumption. However, the model does not take into consideration all possible force components existing during the forming and embossing of a panel such as the forces required to bend a mat into conformance with the contours of a die and the gas pressure forces created by the steam generated from pressing at a high temperature. It has been found that these additional force components produce minor variations in product thickness which can be corrected by modifying the caliper control pushes.

The theory is that all products pressed under identical conditions reach a thickness such that the average densities of the products, found by integrating over the entire surface of each product, are equal. The basic approach of the model is as follows:

1. The pressing force is constant for each panel, A and B, by design of the press where x is the width of a panel, y is the length of a panel and P is the pressure exerted by the panel on the die, therefore $$\text{Force} = \int\int P^*dx^*dy_A = \int\int P^*dx^*dy_B$$

2. P is assumed to be a linear function of panel thickness, t, therefore $$P = m^*t + b$$

where m is slope and c is a constant, and thus $$\int\int (m^*t+b)^*dx^*dy_A = \int\int (m^*t+b)^*dx^*dy_B$$

3. The assumption is made that thickness only varies with respect to panel width, therefore $$t = f(x)$$

and $$\int\int (m^*f_A(x)+b)^*dx^*dy = \int\int (m^*f_B(x)+b)^*dx^*dy$$

4. The integral of y may be factored out of both sides of the equation:

$$\int (m^*f_A(x)+b)^*dx = \int (m^*f_B(x)+b)^*dx$$

5. Rewriting the equation:

$$m^*\int f_A(x)^*dx + \int b^*dx = m^*\int f_B(x)^*dx + \int b^*dx$$

6. Subtracting $\int b^*dx$ from each side of the equation and factoring out m from each side of the equation results in:

$$\int f_A(x)^*dx = \int f_B(x)^*dx$$

In the equations above, the panel thickness is integrated over the width of each panel which yields the cross-sectional area of each panel. The result shows that the cross-sectional areas of panels with different embossing patterns are the same.

Dividing the equations above by the width of the panels, W, yields the average thickness of the panels which are also equal:

$$t_{avg} = 1/W^*\int f_A(x)^*dx = 1/W^*\int f_B(x)^*dx$$

This implies that for a constant basis weight of raw material to be pressed by each different embossing pattern, the average densities of the panels or panel sections will be the same.

The methods of the invention are more fully described in the paragraphs below in connection with the drawings.

The raw material which is pressed by die sets prepared according to the methods of the invention may be any material typically used to form composite panels. The material is initially in the form of mats which may be prepared by a variety of processes. These processes include both wet and dry fiberboard preparation as described in Clarke et al., U.S. Pat. No. 4,007,076 (Feb. 8, 1977) and patents cited therein, the respective disclosures of which are incorporated by reference herein.

Figure 1B:
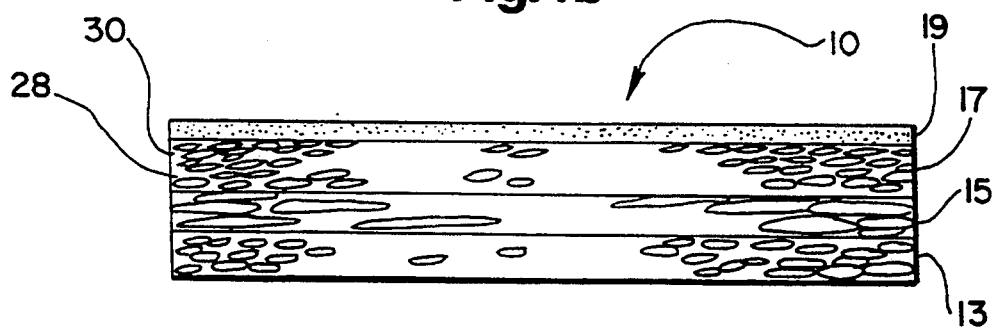

A preferred raw material for use with the methods according to the invention is an oriented strand board ("OSB")-fiberboard composite structure having an OSB base and a fiberboard overlay. FIGS. 1a and 1b illustrate a portion of an OSB-fiberboard composite structure 10 which is cut away to show several details of its construction. The composite structure 10 comprises a bottom flake layer 13, a middle flake or core layer 15, a top flake layer 17 and a dry-process fiberboard overlay layer 19 having a surface or front face 20 upon which decorative embossing (not shown) may be impressed.

A preferred OSB-fiberboard composite structure comprises wood flakes having an approximate specific gravity in the range of about 0.45 to about 0.60 which are utilized to produce a final product having a higher overall specific gravity of about 0.60 to about 0.80. The preparation of the OSB flakes may be accomplished in any convenient manner so as to yield strands having aspect ratios (ratio of length to width) of about 5 to about 30, and moisture contents of about 15 percent or less, preferably about 1 to about 15 percent, based on the dry fiber weight. Generally, green logs having a moisture content of about 40% to about 60% by weight are sliced, and dried to, for example, about 3% by weight moisture, before being screened and contacted with resin. The strands are screened to separate out slivers, which are particles with a width of approximately ⅜ inch or less. However, the conventional practice of placing slivers in the core and larger strands on the faces may be reversed.

The fiber for the overlay may be made from the rough trim cut from the ends and edges of the OSB layer of the OSB-fiberboard composite structure. Such trim is consolidated board with cured resin and wax sizing with the layered structure typical of waferboards and strand boards. The trim strips are chipped, e.g., in a drum chipper and steamed at about 25 psig to about 300 psig saturated steam pressure for a period of about 2 minutes to about 10 minutes, and refined under pressure in a pressurized refiner similar in operation to those used for producing fiber from chips. Because of the layered structure of OSB chips, steam readily penetrates the chip, permeates to and softens the middle lamella (interfiber layer) and permits separation of the individual fibers into a pulp finer than that obtainable by refining log chips. The uniform fiber that results is very compliant and readily densifies into a hardboard layer under heat and pressure with unexpectedly precise embossing fidelity when applied by the dry process. Furthermore, the dried trim produces fiber having a moisture content of 15 percent by weight or less, based on the dry weight of the fiber, that does not require drying prior to hot pressing. An elevated moisture, up to about 15 percent by weight of dry fiber, contributes to the development of consolidation but is not a requirement for consolidation.

The strands preferably are blended with a hydrocarbon size (typically paraffinic or microcrystalline wax) in an amount of about 0.5% to about 4.0%, preferably about 2.5% based on the dry weight of the strands; and, a binder resin, such as phenol formaldehyde resin or a polymeric diphenylmethyl diisocyanate (PMDI) resin, and delivered to a forming machine. The slivers are blended in a similar fashion with the same binder and size and delivered to a forming machine. The overlay fibers are blended with wax and resin, dry-formed and laid onto a support surface, e.g., forming belt, separately by means of forced air or mechanical means, prepressed and transferred to the top major surface of the OSB baseboard mat.

The OSB baseboard is formed preferably in three layers, the first and third using air or mechanical classification to classify the particles so that, preferably, the finest particles are the first down on the forming belt and the last down on the mat. The first layer 13 is laid with strands 22 oriented in the machine direction. The core 15, or central OSB layer, is formed with randomly oriented strands or with the strands 24 oriented in the cross-machine direction. The third (fiberboard adjacent) layer 17 is laid with the strands 26 oriented in the machine direction and preferably with graduation from coarse strands 28 to slivers 30 so that the smallest strands are disposed against the fiberboard overlay. Once the three-layered mat is formed, the preformed dry-process overlay is deposited upon it and the total mat (OSB-fiberboard composite structure) is prepressed prior to cutting into lengths for loading into the platen press for final consolidation.

The formulation of the furnish and the basis weight of the OSB baseboard mat and the overlay can be varied widely. It is preferred that a phenol formaldehyde resin or isocyanate resin binder be used with microcrystalline or paraffinic waxes for sizing. The preferred furnish formulas are generally about 2 to about 10 percent by weight resin and about 0.5 to about 2.5 percent by weight wax based on the dry weight of the fiber. OSB baseboard basis weight can be varied between about 900 and about 2000 pounds/thousand square feet with about 1100 to about 1500, eg., about 1200 pounds/thousand square feet being preferred. The dry-process fiberboard overlay basis weight can range between about 75 and about 400 pounds/thousand square feet with about 200 to about 350 pounds/thousand square feet preferred.

Final pressing of the OSB-fiberboard prepressed composite mat to fully consolidate the composite board preferably should be limited to prevent overcompaction of the board which increases thickness swelling potential. Operating temperatures preferably range between about 250° F. and about 450° F. and operating pressures between about 500 psi and about 750 psi board pressure. Pressing times range between about 3 and about 8 minutes.

Although the pressed board will typically be between about 0.25 inch and about 1.0 inch thick, the preferred product is about 0.400 to about 0.500 inch thick with an overall density in the range of about 38 to about 47 pounds per cubic foot (specific gravity in the range of about 0.60 to about 0.75 oven dry weight and air dry volume basis). Under these conditions, the dry-process fiberboard overlay will average about 50 to about 55 pounds per cubic foot, which is typical for hardboard siding. At a given overall product density, the density of the hardboard overlay can be increased by using fiber moisture contents of approximately 15 percent or less, e.g., 12 percent by weight of dry fiber, and flake moisture contents of about 8 percent or less, e.g., 6 percent by weight of dry flakes. This leads to compliant fiber and relatively stiff flakes which foster tighter overlay surfaces having properties of excellent embossing fidelity, bonding to the OSB baseboard, and weatherability.

The first step of a method of the invention is the designing of one or more first embossing dies, each having one or more decorative patterns thereon. These patterns are designed to meet the aesthetics required by the designer. Often, the patterns replicate conventional wooden structures such as wall and door panels.

Because the presses used for forming composite panels are typically large, two or more different embossing patterns may readily be impressed upon the raw material mats during a single press cycle. For example, for a large press having platens measuring 8 feet in width by 24 feet in length, it would not be unusual to impress one pattern on an 8×16 ft. area of a mat and a different pattern on the remaining 8×8 ft. area. Furthermore, the press may have multiple openings and therefore include numerous platens for impressing a plurality of mats during a single press cycle. Thus, for example, if a large press includes fourteen openings and two patterns are embossed upon each mat, it would be possible to emboss a total of 28 different patterns during a single press cycle.

For the purpose of easily describing the invention, a method shall be described with reference to five different decorative embossing patterns. FIGS. 2a, 3a, 4a, 5a, and 6a depict cross-sections of intermediate panels 42a, 43a, 44a, 45a, and 46a, respectively, each having a front face 52a, 53a, 54a, 55a, and 56a, respectively embossed by embossing dies having different decorative patterns. The following designations are arbitrarily given to the decorative patterns impressed upon each of the faces which simulate various wood panel or lap styles: the face 52a is a textured lap design, the face 53a is a textured panel design, the face 54a is a triple 4 textured lap design, the face 55a is a double 5 textured lap design and the face 56a is a beaded lap design. The embossing dies having the decorative patterns thereon are typically mounted to an upper platen of the press and are therefore designated as upper or first dies. The corresponding backing dies are mounted to a lower platen of the press and are referred to as second or lower dies.

For each upper embossing die which is designed, a corresponding lower or backing die is roughly designed in the second step of a method of the invention. With reference to the drawings, the backing or lower surfaces 62a, 63a, 64a, 65a, and 66a of the panels 42a, 43a, 44a, 45a, and 46a respectively are formed by lower dies designed in the second step of the method.

When designing each backing die, a preferred range of finished panel thickness is first determined. In other words, for a particular mat basis weight, the maximum and minimum allowable product thicknesses are determined which will yield acceptable product properties. Because the basis weight of the raw material impressed by each different pattern is roughly the same, the same maximum and minimum desired product thicknesses are applicable to the design of each backing die. Each backing die is therefore designed so that when forming a panel with a mating decorative embossing die, the thickness at any point along each panel will be between the desired maximum and minimum thickness, inclusive.

Also considered in the method is the desire to minimize the amount of raw material used. Therefore the basis weight of the mats is chosen such that the desired nominal thickness of the generally flat, non-embossed portions of each finished product (i.e. the thickness measured at locations along the product where both the front face and backing face are flat and have not been impressed with a pattern) will be the same as the maximum allowable thickness for the finished product.

Based upon the minimum and maximum thickness calculations, the contour of each backing die is designed to cooperate with each mating upper embossing die to produce a panel having a substantially uniform, desired thickness. Therefore, the backing die may be flat to form generally flat panel surfaces such as the surfaces 62a, 63a, and 66a or may include projections and relief areas roughly corresponding to respective relief areas and projections in the decorative pattern of the upper embossing die. The surfaces 64a and 65a represent lower surfaces embossed by backing dies designed to generally follow the contour of respective upper decorative embossing dies.

Thus, the backing die is also an embossing die. However, it is not necessary for the embossing pattern on the backing die to follow the contours of the upper embossing die with great precision.

It is preferred that the backing die include pushes. A distinction is made herein between molding pushes which are known in the art and caliper control pushes, both of which may be included in the design of a backing die. Molding pushes may be in the form of bar-like projections fixed to the backing die. The molding pushes assist in consolidating the mat material into the angular features of the upper embossing die. Were the decorative embossing patterns vary with respect to die width but not with respect to die length, the molding pushes may be oriented parallel to the length of the die. The thicknesses of such areas may approach the minimum allowable thickness discussed above. The molding pushes are advantageous because they may be easily reduced in size or removed from the backing die surface if necessary to carry out a subsequent step of the method.

Caliper control pushes are also preferably in the form of bar-like projections fixed to the backing die. However, the function of the caliper control pushes is not limited to consolidating the mat material into the angular or concave features of the upper embossing die. Therefore, the location of caliper control pushes in a backing die does not necessarily correspond to angular or concave patterns in a corresponding decorative embossing die. Where a decrease in cross-sectional area is desired, which results in an increase in the nominal panel thickness (the panel thickness measured between flat, non-embossed surfaces of a panel), caliper control pushes may be added to the backing die. Where the decorative embossing patterns vary with respect to die width but not with respect to die length, the caliper control pushes are preferably oriented parallel to the length of the die. The caliper control pushes may be easily reduced in size or removed from the backing die surface if necessary to carry out a subsequent step of the method.

Similar to molding pushes, molding grooves which result in the formation of panel projections such as illustrated by projections 67 of the panel 44a and the projections 69 of the panel 45a may be carved into a backing die in order to provide relief where a corresponding decorative embossing die pattern impresses deeply into the panel.

Where a decrease in nominal panel thickness is desired (measured between the flat, non-embossed surfaces of a panel), caliper control grooves may be incorporated into the backing die design. Similar to the caliper control pushes described above, such grooves may be oriented in spaced relation and generally parallel to the length of the die. If necessary to carry out a subsequent step of the method, the grooves may be filled to produce a panel having a decreased cross-sectional area or volume, resulting in a increased nominal thickness as measured between the flat, non-embossed surfaces of the panel. The use of grooves results in panels having back surfaces with bar-like projections thereon.

Figure 7A:
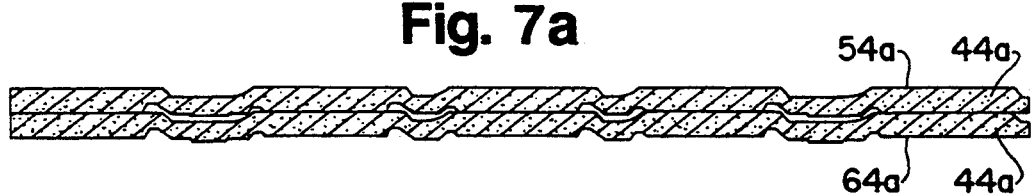

One other consideration in designing the backing die is the stackability of the finished panels. The contour of the backing die is designed so that panels having the same front face embossed patterns may be stacked with the weight of each additional panel to be borne evenly by each panel stacked therebelow and not concentrated at certain points of the panels. To show how this consideration may affect the design of the backing die, FIG. 7a demonstrates the stacking of two identical panels 44a. The backing die is designed so that the generally smooth, flat portions of each surface 54a substantially contact and support the adjacent generally smooth, flat portions of each surface 64a. If the decorative embossing patterns vary with respect to panel width, but not with respect to panel length, the third step of the inventive method involves the calculation of the cross-sectional area of each intermediate panel or panel section being impressed with each different decorative embossing pattern. This step assumes that each panel or panel section is embossed with a pattern which varies with respect to panel width but does not vary with respect to panel length. As illustrated by the drawings in this application, the third step of the method would be to calculate the cross-sectional areas of the panels 42a, 43a, 44a, 45a, and 46a.

An assumption made when calculating these cross-sectional areas is that the panels compress to the desired or target nominal thicknesses, ie. the thickness which would be obtained if the panel were pressed alone, but under the same conditions of temperature, pressure, and time as each other panel for which cross-sectional area is being calculated. A preferred method of calculating the cross-sectional areas is to use computer-aided design software.

In the fourth step of a method of the invention, a preferred cross-sectional area is designated, thereby designating a preferred die set or die set portion. All other die sets or die set portions are therefore non-preferred. Typically, the preferred cross-sectional area is the lowest or minimum cross-sectional area which is calculated. With reference to the drawings, the cross-sectional area of the panel 42a has been chosen to represent the preferred cross-sectional area.

In the fifth step of a method of the invention, the contours of the backing die surfaces of the non-preferred backing dies or die portions are adjusted for producing a panel or panel section having the preferred cross-sectional area determined in the fourth step.

FIGS. 2b, 3b, 4b, 5b, and 6b depict cross-sections of the finished panels 42b, 43b, 44b, 45b, and 46b respectively, each having a front face 52b, 53b, 54b, 55b, and 56b identical to the front faces 52a, 53a, 54a, 55a, and 56a of the respective intermediate panels. However, the finished panels 42b, 43b, 44b, 45b, and 46b also include respective back faces 62b, 63b, 64b, 65b, and 66b formed by backing dies modified pursuant to the inventive method's fifth step.

Where the preferred cross-sectional area is the lowest value calculated, additional embossing material is added to the other backing dies or die portions to produce panels with cross-sectional areas which are generally equal to the panel having the minimum cross-sectional area. The additional embossing material is preferably added in the form of pushes that are most often fixed to the backing dies of die sets which produce products with less aggressive embossing of the front face. The addition of pushes results in panels having grooves on the back surfaces thereof. If necessary, the panels may be sanded to restore a flat surface which facilitates installation against a flat support surface, as in the installation of siding. The grooves 73, 75, and 76 formed in the respective panels 43b, 45b, and 46b are examples of back face contours impressed by pushes affixed to the lower backing dies during the fifth step of the inventive method.

However, if it is unreasonably difficult to add embossing material to some of the dies, a greater cross-sectional area may be chosen as the preferred cross-sectional area and the cross section of the panels with lower cross-sectional areas may be increased by increasing the depth of reliefs or reducing the height of pushes therein.

According to a method of the invention the die set producing the panel or panel section having the preferred cross-sectional area may not necessarily be modified. However, subsequent modification to the backing die of the preferred die set, and possibly to the other non-preferred backing dies, may be desired in order to produce panels or panel sections having substantially the same nominal thicknesses (i.e. approximately the same caliper measured at the generally flat, non-embossed portions of the panels). For this possible additional sixth step, extra pushes may be fixed to the backing dies or extra material added to the existing pushes if a smaller cross-sectional area is desired. If a larger cross-sectional area is desired, material may be removed from existing pushes or grooves may be made in the backing dies. An example of the optional sixth step is illustrated with regard to the panel 42b which includes a front face 52b identical to the face 52a of the panel 42a, but also includes a back face 62b having grooves 82 formed from pushes added to a backing die during the sixth step of a method of the invention. By adding such pushes to the backing die, the cross-sectional area of the panel is decreased but the nominal thickness measured from the non-embossed surface 83 to the surface 52b is increased.

It is preferable that each of the backing dies is originally designed with caliper control pushes. These pushes may then be reduced in size in the field for fine tuning of the thickness of the products.

Figure 7B:
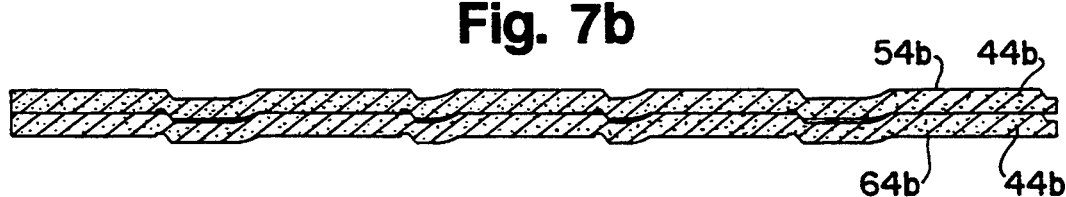
FIG. 7b is a cross-sectional view of two panels according to FIG. 4b.

As with the second step of the method described above, a consideration in designing the backing dies according to the fifth and sixth steps is the uniform and balanced stackability of the finished panels. To indicate how this consideration may affect the design of the backing die, FIG. 7b demonstrates the stacking of two identical finished panels 44b. The backing die is designed so that the generally smooth, flat portions of each surface 54b substantially contact and support the adjacent generally smooth, flat portions of each surface 64b.

Another method according to the invention is utilized when the embossing patterns vary with respect to panel width and length. In this method, the calculations of cross-sectional area described in the fourth and fifth steps as described above are replaced by calculations of panel volume. Otherwise, a method identical to the method described in the first through fifth steps is followed.

The invention also includes methods of simultaneously forming wood composite panels having different patterns embossed thereon using dies made according to the inventive die design methods.

By these methods, die sets may be designed for use on platen presses formerly used to produce either smooth, flat panels or panels embossed with a single pattern. The die design methods of the invention compensate for the lack of direct caliper control at specific locations on such presses without requiring the use of additional raw material or complex modification of such presses to provide individual caliper control. The composite panels formed by die sets designed according to the methods of the invention have generally uniform densities and exhibit adequate physical properties. In laboratory tests, the difference between desired and obtained thicknesses for embossed products has been reduced to about five percent or less when a method according to the invention is utilized to design the backing dies.

EXAMPLE

The invention is further described and illustrated by the following detailed example which is not intended to be limiting.

OSB-fiberboard composite structures, each having an OSB base and a fiberboard overlay as described herein with reference to FIGS. 1a and 1b, are utilized as raw material mats to form 20×20 inch panels, each having one of five different decorative patterns embossed thereon. The five patterns used are textured lap, textured panel, triple 4 textured lap, double 5 textured lap and beaded lap. These patterns vary with respect to panel length, but not with respect to panel width. Nominal thicknesses (in inches, measured at the flat, non-embossed portions of the panels) for intermediate and final panels prepared according to the invention are set forth in Table 1 (and cross-referenced with the drawings):

TABLE 1

| Profile | Intermediate | | Final | |
| --- | --- | --- | --- | --- |
| | FIG. | Thickness | FIG. | Thickness |
| textured lap | 2a | 0.425 | 2b | 0.429 |
| textured panel | 3a | 0.440 | 3b | 0.435 |
| triple 4 lap | 4a | 0.500 | 4b | 0.436 |

TABLE 1-continued

| Profile | Intermediate | | Final | |
| --- | --- | --- | --- | --- |
| | FIG. | Thickness | FIG. | Thickness |
| double 5 lap | 5a | 0.473 | 5b | 0.434 |
| beaded lap | 6a | 0.450 | 6b | 0.437 |

All panels are made in a 20×20 inch laboratory press. Each OSB base is made with the same amount of PMDI binder resin. The moisture contents of overlay fiber and base flakes are 6.0% and 8.3% respectively. The basis weight of the material used for each panel formed is approximately 1.5 lb/ft².

Figure 8:
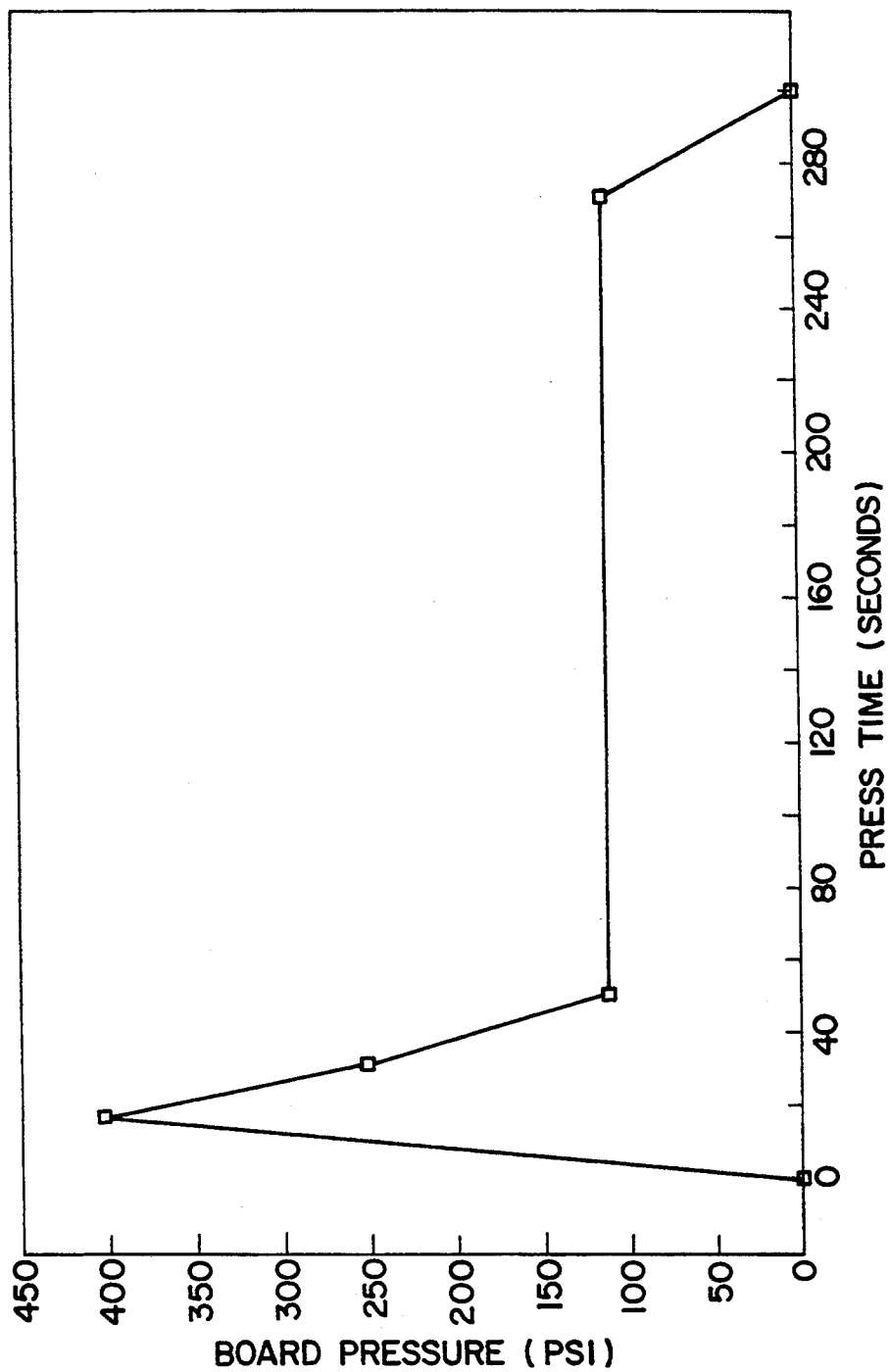
FIG. 8 is a graph illustrating a press cycle utilized to form panels according to a method of the invention.

The same press cycle (illustrated at FIG. 8) is used to prepare each intermediate panel formed from five different die sets. The press cycle of FIG. 8 is designed to press a 20×20 inch panel having the textured lap design profile pressed to a 0.425 inch nominal thickness. Therefore, according to the invention, the die set used for forming the textured lap panel is the preferred die set and a preferred cross-sectional calculated according to the invention is approximately 8.07 in².

Modifications are made to the backing dies used to make the textured panel, triple 4 textured lap, double 5 textured lap and beaded lap panels including reducing the heights of pushes, increasing the depth of grooves, changing the shape of grooves and modifying the backing die contours to result in the final nominal thickness values shown in Table 1.

Figure 2A:
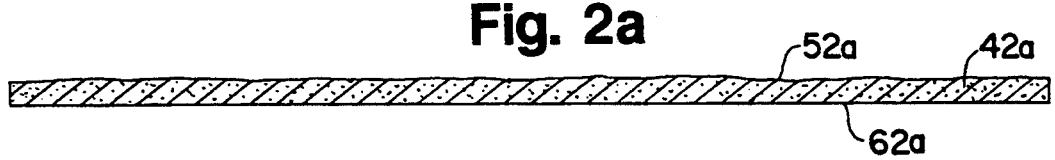
FIG. 2a is a cross-sectional view of an intermediate composite panel prepared according to a method of the invention.
Figure 2B:
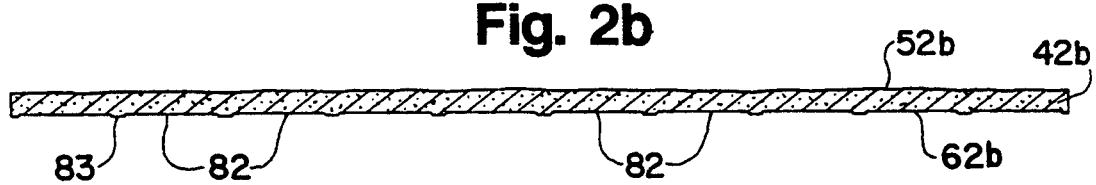
FIG. 2b is a cross-sectional view of a final composite panel prepared according to a method of the invention.
Figure 3A:
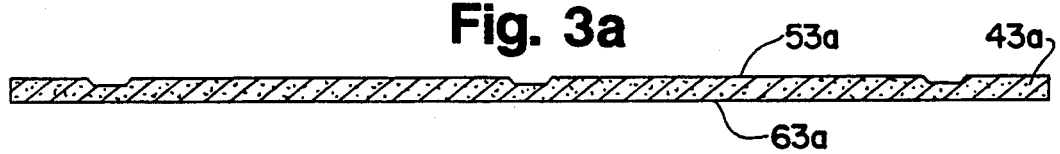
FIG. 3a is a cross-sectional view of an intermediate composite panel prepared according to a method of the invention.
Figure 3B:
FIG. 3b is a cross-sectional view of a final composite panel prepared according to a method of the invention.
Figure 4A:
FIG. 4a is a cross-sectional view of an intermediate composite panel prepared according to a method of the invention.
Figure 4B:
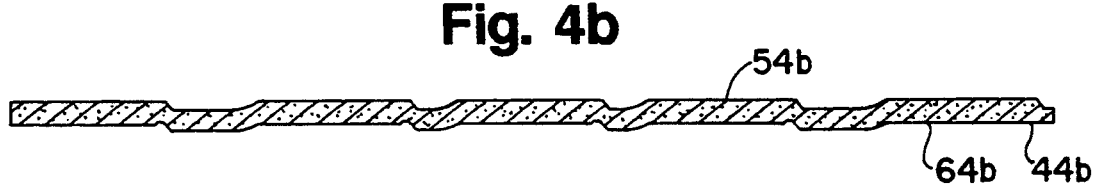
FIG. 4b is a cross-sectional view of a final composite panel prepared according to a method of the invention.
Figure 5A:
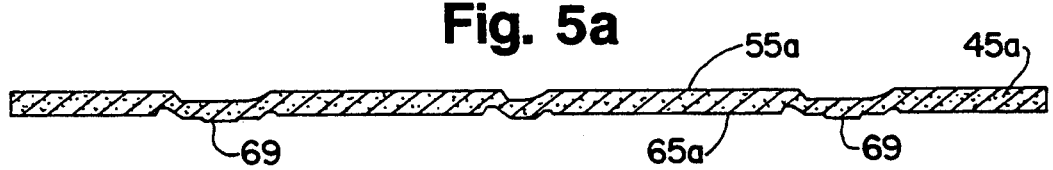
FIG. 5a is a cross-sectional view of an intermediate composite panel prepared according to a method of the invention.
Figure 5B:
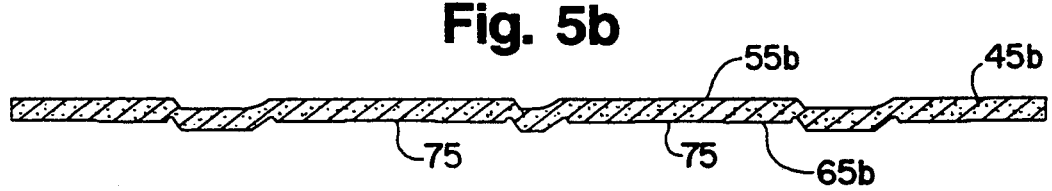
FIG. 5b is a cross-sectional view of a final composite panel prepared according to a method of the invention.
Figure 6A:
FIG. 6a is a cross-sectional view of an intermediate composite panel prepared according to a method of the invention.
Figure 6B:
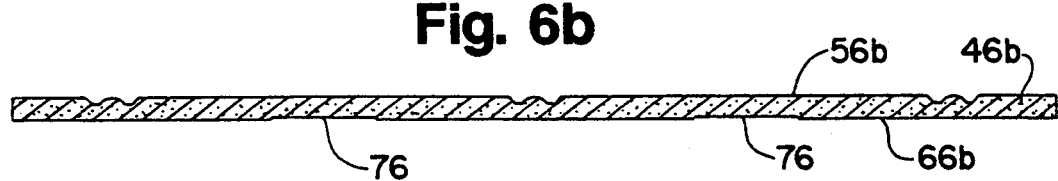
FIG. 6b is a cross-sectional view of a final composite panel prepared according to a method of the invention.

Design modification of the preferred textured lap panel backing die is also performed in order to slightly decrease the cross-sectional area (and therefore increase the nominal thickness) of the textured lap panel to bring it closer to those of the other finished panels. As illustrated in FIG. 2b, pushes are added to the backing die which produce the bar-like grooves 82 formed in the panel 42b.

Figure 9:
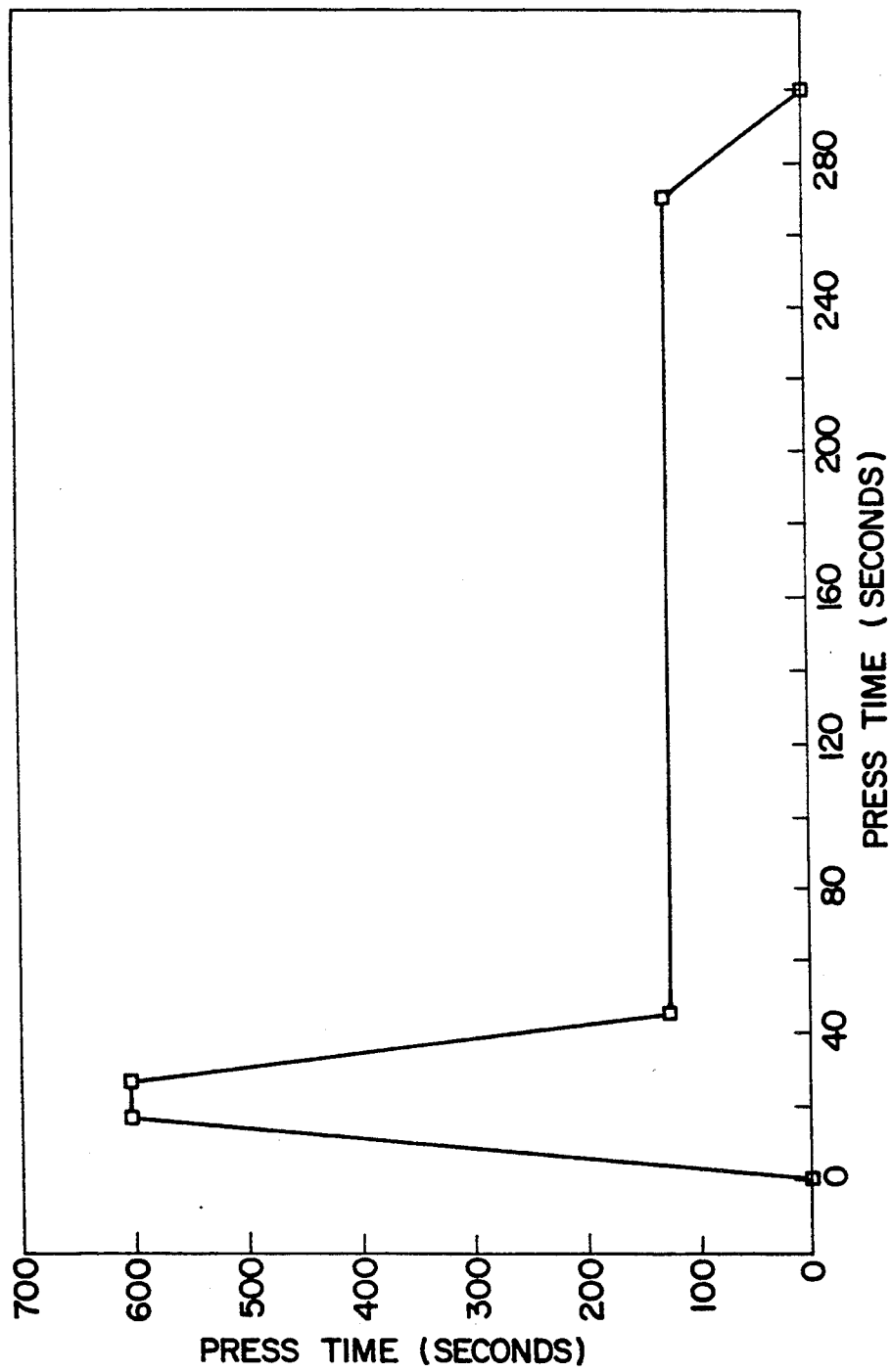
FIG. 9 is a graph illustrating another press cycle utilized to form panels according to a method of the invention.

A final fine tuning step is to modify the press cycle illustrated at FIG. 8 to the press cycle illustrated at FIG. 9. All the final thickness values set forth in Table 1 are taken from panels formed using this revised press cycle.

The test results of Table 1 illustrate that the thickness of the intermediate panels may range as much as fifteen percent from the desired (0.425 inch) thickness of the textured lap panel. In contrast, the thickness values for the final panels having backing dies designed according to the method of the invention range less than three percent from the desired (0.429 inch) thickness of the textured lap panel.

The foregoing detailed description is given for clearness of understanding only, and no unnecessary limitations are to be understood therefrom, as modifications within the scope of the invention will be apparent to those skilled in the art.

We claim:

1. A method of die set design for use in the production of composite products produced by the simultaneous consolidation and embossing of at least two embossing patterns onto raw material during one press cycle of a single press, where the embossing patterns vary with respect to product width, but not with respect to product length, said method comprising the steps of:
   (a) designing at least two decorative embossing patterns on at least one first embossing die,
   (b) designing a second die corresponding to each said first die, each corresponding first and second die forming a die set, each second die being designed to cooperate with each first die to format least one finished composite product having a substantially uniform desired nominal thickness and wherein said composite product may include product sections, each section embossed with a different embossing pattern,
   (c) calculating the cross-sectional area of each section of each finished composite product of (b) impressed with a different decorative embossing pattern,
   (d) designating a preferred die set or die set portion defining a preferred cross-sectional area from the cross-sectional areas determined in (c), all other die sets or die set portions being considered non-preferred and
   (e) adjusting the second die of each non-preferred die set or die set portion to produce a product section having the preferred cross-sectional area.

2. The method according to claim 1 wherein the product is in the form of a panel.

3. The method according to claim 2 wherein two different decorative embossing patterns are embossed onto one panel.

4. The method according to claim 2 wherein two or more die sets are designed, each first die of each die set being embossed with one decorative pattern.

5. The method according to claim 1 wherein the cross-sectional area calculations of (c) are performed using computer-aided design software.

6. The method according to claim 1 wherein the raw material is a mat of wood composite materials comprising an oriented strand board base and a fiberboard overlay.

7. The method according to claim 1 wherein a second die includes a generally flat embossing surface.

8. The method according to claim 1 wherein a second die includes projections and relief areas generally following the contours of the corresponding first die.

9. The method according to claim 1 comprising the steps of:
   (f) simultaneously forming composite product sections using the die sets designed according to steps (a) through (e), and
   (g) adjusting each second die to produce product sections having substantially equal nominal thicknesses.

10. The method according to claim 1 wherein a second die includes a plurality of caliper control pushes fixed thereon, said pushes being adapted for use in step (e) wherein a reduction of the size of the pushes of a second die results in an increase in the cross-sectional area of a product section produced by the die.

11. The method according to claim 10 wherein said pushes are in spaced parallel relation.

12. The method according to claim 1 wherein a second die includes a plurality of caliper control grooves, said grooves being adapted for use in step (e) wherein embossing material may be added to said grooves resulting in a decrease in the cross-sectional area of a product section produced by the die.

13. The method according to claim 12 wherein said grooves are in spaced parallel relation.

14. In a method of die set design for use in the production of wood composite products produced by the simultaneous consolidation and embossing of at least two embossing patterns onto raw wood composite material during one press cycle of a single press, where the embossing patterns vary with respect to product width, but not with respect to product length, the method including the steps of designing at least two decorative embossing patterns on at least one first embossing die, designing a second die corresponding to each said first die, each corresponding first and second die forming a die set, each second die being designed to cooperate with each first die to form at least one finished composite product wherein said composite product may include product sections, each section embossed with a different embossing pattern, the improvement comprising the steps of:

(a) calculating the cross-sectional area of each section of each finished composite product impressed with a different decorative embossing pattern, (b) designating a preferred die set or die set portion defining a preferred cross-sectional area from the cross-sectional areas determined in (a), all other die sets or die set portions being considered non-preferred and (c) adjusting the second die of each non-preferred die set or die set portion to produce a product section having the preferred cross-sectional area.

15. The improved method according to claim 14 wherein the wood product is in the form of a panel.

16. The improved method according to claim 15 wherein two different decorative embossing patterns are embossed onto one panel.

17. The improved method according to claim 15 wherein two or more die sets are designed, each first die of each die set being embossed with one decorative pattern.

18. The improved method according to claim 14 wherein the cross-sectional area calculations of (a) are performed using computer-aided design software.

19. The improved method according to claim 14 wherein the raw wood composite material is a mat comprising an oriented strand board base and a fiberboard overlay.

20. The improved method according to claim 14 wherein a second die includes a generally flat embossing surface.

21. The improved method according to claim 14 wherein a second die includes projections and relief areas generally following the contours of the corresponding first die.

22. A method of die set design for use in the production of composite products produced by the simultaneous consolidation and embossing of at least two embossing patterns onto raw material during one press cycle of a single press, where the embossing patterns vary with respect to product width and with respect to product length, said method comprising the steps of:

(a) designing at least two decorative embossing patterns on at least one first embossing die, (b) designing a second die corresponding to each said first die, each corresponding first and second die forming a die set, each second die being designed to cooperate with each first die to format least one finished composite product having a substantially uniform desired nominal thickness and wherein said composite product may include product sections, each section embossed with a different embossing pattern, (c) calculating the volume of each section of each finished composite product of (b) impressed with a different decorative embossing pattern, (d) designating a preferred die set or die set portion defining a preferred volume from the volumes determined in (c), all other die sets or die set portions being considered non-preferred and (e) adjusting the second die of each non-preferred die set or die set portion to produce a product section having the preferred volume.

23. The method according to claim 22 wherein the product is in the form of a panel.

24. The method according to claim 23 wherein two different decorative embossing patterns are embossed onto one panel.

25. The method according to claim 23 wherein two or more die sets are designed, each first die of each die set being embossed with one decorative pattern.

26. The method according to claim 22 wherein the volume calculations of (c) are performed using computer-aided design software.

27. The method according to claim 22 wherein the raw material is a mat of wood composite materials comprising an oriented strand board base and a fiberboard overlay.

28. The method according to claim 22 wherein a second die includes a generally flat embossing surface.

29. The method according to claim 22 wherein a second die includes projections and relief areas generally following the contours of the corresponding first die.

30. The method according to claim 22 comprising the steps of:

(f) simultaneously forming composite product sections using the die sets designed according to steps (a) through (e), and (g) adjusting each second die to produce product sections having substantially equal nominal thicknesses.

31. The method according to claim 22 wherein a second die includes a plurality of caliper control pushes fixed thereon, said pushes being adapted for use in step (e) wherein a reduction of the size of the pushes of a second die results in an increase in volume of a product section produced by the die.

32. The method according to claim 31 wherein said pushes are in spaced parallel relation.

33. The method according to claim 22 wherein a second die includes a plurality of caliper control grooves, said grooves being adapted for use in step (e) wherein embossing material may be added to said grooves resulting in a decrease in the volume of a product section produced by the die.

34. The method according to claim 33 wherein said grooves are in spaced parallel relation.

35. In a method of making wood composite products produced by the simultaneous consolidation and embossing of two or more embossing patterns onto raw wood composite material during one press cycle of a single press, where the embossing patterns vary with respect to product width, but not with respect to product length, the method including the steps of designing at least two decorative embossing patterns on at least one first embossing die, designing a second die corresponding to each said first die, each corresponding first and second die forming a die set, each second die being designed to cooperate with each first die to form at least one finished composite product wherein said composite product may include product sections, each section embossed with a different embossing pattern, the improvement comprising the steps of:

(a) calculating the cross-sectional area of each section of each finished composite product impressed with a different decorative embossing pattern, (b) designating a preferred die set or die set portion defining a preferred cross-sectional area from the cross-sectional areas determined in (a), all other die sets or die set portions being considered non-preferred, (c) adjusting the second die of each non-preferred die set or die set portion to produce a product section having the preferred cross-sectional area and (d) simultaneously forming product sections utilizing die sets designed by steps (a) through (c) above.

36. The improved method according to claim 35 wherein the wood product is in the form of a panel.

37. The improved method according to claim 36 wherein two different decorative embossing patterns are embossed onto one panel.

38. The improved method according to claim 36 wherein two or more die sets are designed, each first die of each die set being embossed with one decorative pattern.

39. The improved method according to claim 35 wherein the cross-sectional area calculations of (a) are performed using computer-aided design software.

40. The improved method according to claim 35 wherein the raw wood composite material is a mat comprising an oriented strand board base and a fiberboard overlay.

41. The improved method according to claim 35 wherein a second die includes a generally flat embossing surface.

42. The improved method according to claim 35 wherein a second die includes projections and relief areas generally following the contours of the corresponding first die.

43. In a method of making wood composite products produced by the simultaneous consolidation and embossing of two or more embossing patterns onto raw wood composite material during one press cycle of a single press, where the embossing patterns vary with respect to product width and with respect to product length, the method including the steps of designing at least two decorative embossing patterns on at least one first embossing die, designing a second die corresponding to each said first die, each corresponding first and second die forming a die set, each second die being designed to cooperate with each first die to format least one finished composite product wherein said composite product may include product sections, each section embossed with a different embossing pattern, the improvement comprising the steps of:

(a) calculating the volume of each section of each finished composite product impressed with a different decorative embossing pattern, (b) designating a preferred die set or die set portion defining a preferred volume from the volumes determined in (a), all other die sets or die set portions being considered non-preferred, (c) adjusting the second die of each non-preferred die set or die set portion to produce a product section having the preferred volume and (d) simultaneously forming product sections utilizing die sets designed by steps (a) through (c) above.

44. The improved method according to claim 43 wherein the wood product is in the form of a panel.

45. The improved method according to claim 44 wherein two different decorative embossing patterns are embossed onto one panel.

46. The improved method according to claim 44 wherein two or more die sets are designed, each first die of each die set being embossed with one decorative pattern.

47. The improved method according to claim 43 wherein the volume calculations of (a) are performed using computer-aided design software.

48. The improved method according to claim 43 wherein the raw wood composite material is a mat comprising an oriented strand board base and a fiberboard overlay.

49. The improved method according to claim 43 wherein a second die includes a generally flat embossing surface.

50. The improved method according to claim 43 wherein a second die includes projections and relief areas generally following the contours of the corresponding first die.

* * * * *

UNITED STATES PATENT AND TRADEMARK OFFICE
CERTIFICATE OF CORRECTION

PATENT NO. : 5,397,406
DATED : March 14, 1995
INVENTOR(S) : Dennis H. Vaders and Nian-hua Ou It is certified that error appears in the above-indentified patent and that said Letters Patent is hereby corrected as shown below:

In Figure 9, please delete the ordinate caption "PRESS TIME (SECONDS)" and insert --BOARD PRESSURE (PSI)-- in lieu thereof.

In column 5, line 38, after "slope and" please delete the letter "c" and insert the letter --b-- in lieu thereof.

In column 9, line 47, please delete the word "Were" and insert --Where-- in lieu thereof.

In column 10, lines 56-60, please delete "ie. the thickness which would be obtained if the panel were pressed alone, but under the same conditions of temperature, pressure, and time as each other panel for which cross-sectional area is being calculated".

In column 14, line 2, please delete the word "format" and insert --form at-- in lieu thereof.

UNITED STATES PATENT AND TRADEMARK OFFICE
CERTIFICATE OF CORRECTION

PATENT NO. : 5,397,406
DATED : March 14, 1995
INVENTOR(S) : Dennis H. Vaders and Nian-hua Ou It is certified that error appears in the above-indentified patent and that said Letters Patent is hereby corrected as shown below:

In column 15, line 60, please delete the word "format" and insert --form at-- in lieu thereof.

In column 17, line 11, please start the letter (d) on the following line (line 12).

In column 18, line 4, please delete the word "format" and insert --form at-- in lieu thereof.

Signed and Sealed this

Thirteenth Day of June, 1995

Attest:

BRUCE LEHMAN

Attesting Officer     Commissioner of Patents and Trademarks